(12) United States Patent
Kim et al.

(10) Patent No.: US 6,845,019 B2
(45) Date of Patent: Jan. 18, 2005

(54) FLYBACK CONVERTER

(75) Inventors: Jung-Won Kim, Seoul (KR);
Dong-Young Huh, Bucheon (KR)

(73) Assignee: Fairchild Korea Semiconductor Ltd.,
Bucheon (KR)

( * ) Notice: Subject to any disclaimer, the term of this patent is extended or adjusted under 35 U.S.C. 154(b) by 0 days.

(21) Appl. No.: 10/346,807

(22) Filed: Jan. 17, 2003

(65) Prior Publication Data

US 2004/0032752 A1 Feb. 19, 2004

(30) Foreign Application Priority Data

Jan. 25, 2002 (KR) ................................. 10-2002-0004402

(51) Int. Cl.⁷ ........................................... H02M 3/335
(52) U.S. Cl. ................... 363/21.16; 363/21.18
(58) Field of Search ............................ 363/21.01, 21.4,
363/21.12, 21.16, 21.09; 323/299, 201,
222, 303

(56) References Cited

U.S. PATENT DOCUMENTS 5,734,564 A * 3/1998 Brkovic .................... 363/21.16

* cited by examiner

*Primary Examiner*—Rajnikant B. Patent
(74) *Attorney, Agent, or Firm*—Sidley Austin Brown & Wood LLP

(57) ABSTRACT

A flyback converter detects an output voltage at the primary coil without using a photo coupler and provides an essentially constant output voltage independent of the load size, thereby minimizing the number of additional coils used in the transformer circuit to realize simple construction and providing accurate power control. In one embodiment, the flyback converter includes: a transformer for changing an input voltage to a predetermined level according to a winding ratio; an output unit for rectifying the voltage signal output from the transformer into a DC signal to drive a load; a switch coupled to the primary coil of the transformer for controlling the on/off state of a power at the primary coil according to a switching control signal; a feedback unit generating a feedback signal and detecting a current of the switch to correct the feedback signal; and a switching controller operating according to the feedback signal.

15 Claims, 7 Drawing Sheets

FLYBACK CONVERTER

CROSS-REFERENCE TO RELATED APPLICATION

This application claims priority to Korean Patent Application number 2002-0004402 filed Jan. 25, 2002.

BACKGROUND OF THE INVENTION

1. Field of the Invention

The present invention relates to power conversion. More specifically, the present invention relates to a flyback converter that detects an output voltage at the primary coil without using a photo coupler and provides an essentially constant output voltage independent of the size of a load, thereby minimizing the number of additional coils used in the transformer circuit.

2. Description of the Related Art

A DC-to-DC converter is a device for transforming a DC voltage, which converts a DC input voltage to an AC voltage, and after boosting or reducing the voltage with a transformer, rectifies the AC voltage to produce a DC output voltage. DC-to-DC converters are classified as forward converters and flyback converters, depending on the construction of the transformer.

A loss of power under a light load in a converter is controlled according to treaty provisions related to regulations for reducing energy consumption. Conventionally, power consumption under a light load should be less than three watts according to the ENERGY STAR standard. As control of power consumption has been tightened in recent years, the suggested power consumption under a light load has become less than one watt, according to the BLUE ANGEL standard.

Some previously-developed flyback converters detect an output voltage using a separate detecting coil at the primary winding of the transformer to reduce power consumption. These flyback converters include the transformer for changing the DC input voltage to a predetermined level according to a winding ratio of a primary coil to a secondary coil; an output unit for rectifying an output voltage signal of the transformer into a DC voltage to drive a load; and a switch coupled to the primary coil of the transformer, which controls the on/off state of the power at the primary coil according to a control signal from a feedback unit.

In the described previously-developed flyback converters the switching time varies with the load. The heavier the load, the longer the switching time. This dependence of the switching time on the load makes controlling the switching difficult.

Other previously-developed flyback converters detect the output voltage at the detecting coil and correct the detected value. However, these flyback converters require a separate power supply circuit for controlling the switch and additional coils coupled to the transformer. Such requirements make these flyback converters more complicated and larger.

Finally, some previously-developed flyback converters incorporate a photo coupler to detect the output voltage at the secondary winding of the transformer. However, these flyback converters also require a separate power supply circuit for the photo coupler, thus reducing power efficiency.

SUMMARY OF THE INVENTION

According to some embodiments of the present invention a flyback converter is provided which detects the output voltage at the primary coil without using a photo coupler. According to some other embodiments of the invention a driving power source is provided with a capacity adequate for the size of a load, minimizing the number of additional coils in the transformer circuit. These embodiments have a simple layout and an accurate power control.

In one aspect of the present invention, a flyback converter generates an essentially constant output voltage independent of the size of a load. The flyback converter includes a transformer, which changes an input voltage to a predetermined level according to a winding ratio of a primary coil to a secondary coil. An output unit rectifies a voltage signal output from the transformer into a DC signal and drives the load. A switch, coupled to the primary coil of the transformer, controls the on/off state of a power at the primary coil according to an input switching control signal. A feedback unit detects the voltage signal output from the transformer to the output unit. The feedback unit generates a feedback signal, detects a switching current of the switch to correct the feedback signal, and outputs the corrected feedback signal. A switching controller receives an output signal of the feedback unit and generates a switching control signal for controlling the operation of the switch.

The feedback unit includes a detecting coil, which detects the power output from the transformer. A driving power generator rectifies a detected signal of the detecting coil to generate a driving power for the operation of the switching controller. A switch current operator detects a current variation according to the switching operation of the switch and generates a converted current signal. A gain regulator regulates the gain of the converted current signal output from the switch current operator to generate a corrected current signal. A feedback signal generator reduces the driving power signal output from the driving power generator by a voltage drop corresponding to the corrected current signal output from the gain regulator to generate a feedback voltage signal to the switching controller.

The driving power generator includes a diode having an anode coupled to the other terminal of the detecting coil; a resistor having one terminal coupled to the cathode of the diode; a capacitor having one terminal coupled to the other terminal of the resistor and the other terminal coupled to ground; and a current source coupled between both terminals of the capacitor.

Here, the diode and the resistor may be switched in position and the current source includes an operating current value of the switching controller, an additional current source, or the sum of an operating circuit of the switching controller and an additional current source.

The feedback signal generator may include a resistor having one terminal coupled to an output signal of the driving power generator and the other terminal coupled to the gain regulator; and a capacitor having one terminal coupled to the other terminal of the resistor and the other terminal coupled to a ground.

In another aspect of the present invention, a flyback converter generates an essentially constant output voltage independent of the size of a load. The flyback converter includes a transformer, which changes an input voltage to a predetermined level according to a winding ratio of a primary coil to a secondary coil. An output unit rectifies a voltage signal output from the transformer into a DC signal and drives the load. A switch, coupled to the primary coil of the transformer, controls the on/off state of a power at the primary coil according to an input switching control signal. A feedback unit detects the voltage signal output from the transformer to the output unit to generate a driving power, filters the driving signal in multiple steps to generate a stabilized feedback signal, and detects a switching current of the switch to correct the feedback signal. A switching controller receives an output signal of the feedback unit and generates a switching control signal for controlling the operation of the switch.

The feedback unit includes a detecting coil, which detects the power output from the transformer. A driving power generator rectifies a detected signal of the detecting coil to generate a driving power for the operation of the switching controller. A switch current operator detects a current variation according to the switching operation of the switch to generate a converted current signal. A gain regulator regulates the gain of the converted current signal output from the switch current operator to generate a corrected current signal. A feedback signal generator stabilizes the driving power signal output from the driving power generator and reduces the stabilized driving power signal by a voltage drop corresponding to the corrected current signal output from the gain regulator to generate a feedback voltage signal to the switching controller.

The driving power generator includes a diode having an anode coupled to a terminal of the detecting coil; a resistor having one terminal coupled to the cathode of the diode; a capacitor having one terminal coupled to the other terminal of the resistor and the other terminal coupled to a ground; and a current source coupled between both terminals of the capacitor.

Here, the diode and the resistor may be switched in position, and the current source includes an operating current value of the switching controller, an additional current source, or the sum of an operating circuit of the switching controller and an additional current source.

The feedback signal generator may include a first stage stabilizer and m-th to n-th stage stabilizers coupled in series for stabilizing the output signal of the driving power generator.

The first stage stabilizer may include a resistor having one terminal coupled to an output signal of the driving power generator and the other terminal coupled to the gain regulator; and a capacitor having one terminal coupled to the other terminal of the resistor and the other terminal coupled to ground.

The driving power generator may include a diode having an anode coupled to the other terminal of the detecting coil; a capacitor having one terminal coupled to the cathode of the diode and the other terminal coupled to ground; and a current source coupled between both terminals of the capacitor.

Here, the diode and the resistor may be switched in position, and the current source includes an operating current value of the switching controller, an additional current source, or the sum of an operating circuit of the switching controller and an additional current source.

The feedback signal generator may include a first stage stabilizer and m-th to n-th stage stabilizers coupled in series for filtering the output signal of the driving power generator; and a current source coupled to the after-terminal of any one of the stage stabilizers.

Here, the diode and the resistor may be switched in position, and the current source includes an operating current value of the switching controller, an additional current source, or the sum of an operating circuit of the switching controller and an additional current source.

BRIEF DESCRIPTION OF THE DRAWINGS

For a more complete understanding of the present invention and for further and advantages, reference is now made to the following description taken in ion with the accompanying drawings.

DETAILED DESCRIPTION

Embodiments of the present invention and their advantages are best understood by referring to FIGS. 1–8 of the drawings. Like numerals are used for like and corresponding parts of the various drawings.

Figure 1:
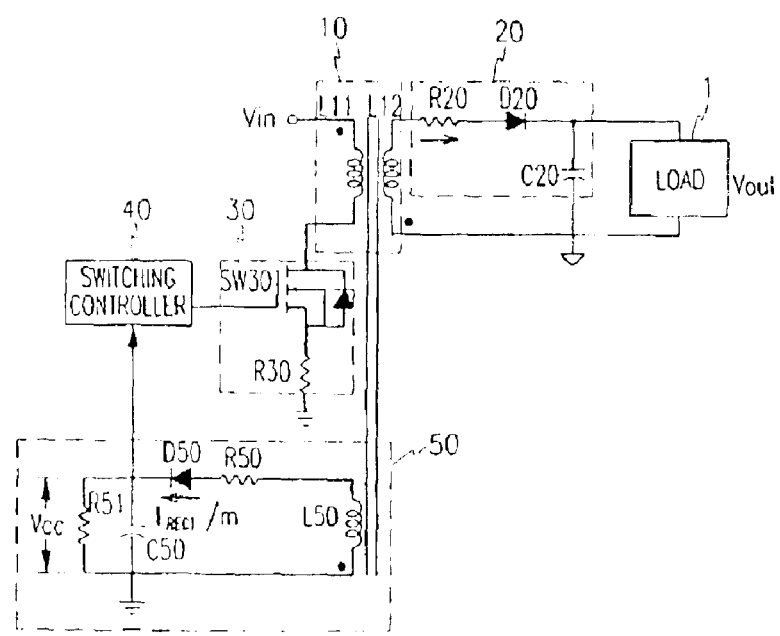
FIG. 1 is a circuit diagram of a flyback converter.

FIG. 1 illustrates an embodiment of a flyback converter, which detects an output voltage using a separate detecting coil at the primary winding to reduce power consumption.

In some embodiments of the flyback converter, a transformer 10 changes an input voltage to a predetermined level according to a winding ratio of a primary coil to a secondary coil. An output unit 20 rectifies an output voltage signal of the transformer 10 into a DC voltage to drive a load 1. A switch 30, coupled to the primary coil of the transformer 10, controls the on/off state of the power at the primary coil according to an input switching control signal. A feedback unit 50 detects the voltage signal output from the transformer 10 to the output unit 20 and generates a corresponding signal. A switching controller 40 receives the output signal of the feedback unit 50 and generates the switching control signal for controlling the operation of the switch 30.

The transformer 10 may include a primary coil L11 having one terminal coupled to an input power Vin and the other terminal coupled to the switch 30. A secondary coil L12 receives an induced current from the primary coil L11 and has one terminal coupled to the output unit 20 and the other terminal coupled to ground.

The output unit 20 may include an output resistor R20 representing a resistance of the transformer 10 and a parasitic resistance of the output unit. A diode D20 has an anode coupled to a terminal of the output resistor R20 and a cathode coupled to the load 1. A capacitor C20 has one terminal coupled to the cathode of the diode D20 and the other terminal coupled to ground.

The switch 30 may include a MOSFET (Metal Oxide Silicon Field Effect Transistor) switch SW30 having a gate coupled to the output terminal of the switching controller 40.

A resistor R30 has one terminal coupled to the source of the MOSFET switch SW30 and the other terminal coupled to ground.

The feedback unit 50 may include a detecting coil L50 which detects an output power of the transformer 10 and has one terminal coupled to ground. A first resistor R50 has one terminal coupled to the other terminal of the detecting coil L50. A diode D50 has an anode coupled to the other terminal of the first resistor R50 and a cathode coupled to the switching controller 40. A capacitor C50 has one terminal coupled to the cathode of the diode D50 and the other terminal coupled to ground. A second resistor R51 has one terminal coupled to the cathode of the diode D50 and the other terminal coupled to ground.

Some embodiments of the flyback converter are operable as follows. The transformer 10 changes an input voltage Vin to a predetermined level according to the winding ratio of the primary coil L11 to the secondary coil L12. The output unit 20 rectifies the voltage signal output from the transformer 10 into a DC signal and drives the load 1.

The feedback unit 50 can detect the voltage induced in the secondary coil L12 by the primary coil L11 of the transformer 10 and in response generates a corresponding signal to the switching controller 40.

The detecting coil L50 of the feedback unit 50 may detect a voltage induced in the secondary coil L12 by the primary coil L11 of the transformer 10. The diode D50 can rectify the detected voltage of the detecting coil L50 and outputs a corresponding voltage signal to the switching controller 40 via the capacitor C50 and the resistor R51.

The switching controller 40 can receive the signal output from the feedback unit 50 and generates a switching control signal to control the power transferred from the primary coil L11 of the transformer 10 to the secondary coil L12.

The MOSFET switch SW30 of the switch 30 is turned on and off according to the switching control signal. The switching control signal is generated by the switching controller 40 to control the power transferred from the transformer 10 to the output unit 20.

The magnitude of the signal detected by the detecting coil L50 of the feedback unit 50 is dependent upon the size of the load 1.

Figure 2:
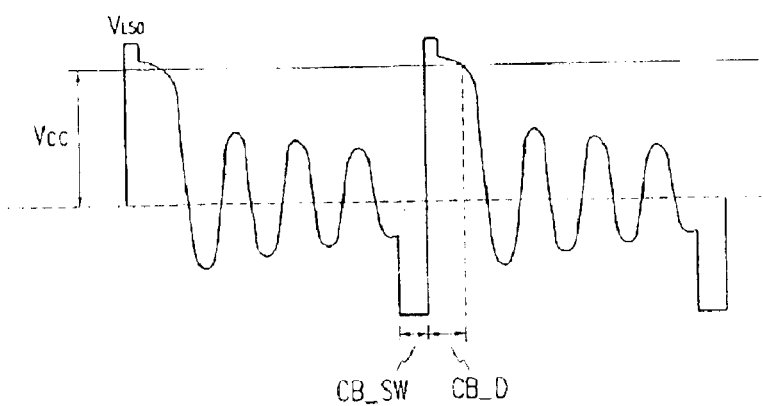
FIG. 2 is a waveform diagram of an output signal detected by a coil under a light load in FIG. 1.

FIG. 2 illustrates the detected voltage at the detecting coil L50 under a light load, i.e., when the driven load 1 is low. In this case the switch 30 may perform a switching operation with a switch conduction time CB_SW and a diode conduction time CB_D as shown in FIG. 2.

Figure 3:
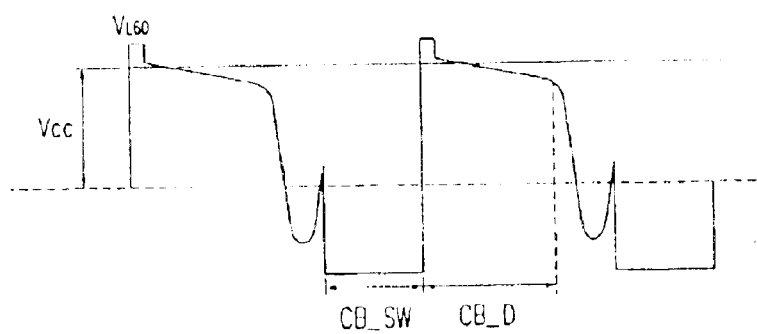
FIG. 3 is a waveform diagram of an output signal detected by a coil under a heavy load in FIG. 1.

FIG. 3 illustrates the detected voltage at the detecting coil L50 under a heavy load, i.e., when the driven load 1 is high. In this case the switch 30 may perform a switching operation with a switch conduction time CB_SW and a diode conduction time CB_D as shown in FIG. 3.

Some flyback converters that operate as described above have difficulty controlling the switching precisely because the voltage detected by detecting coil L50 depends on the load condition.

Figure 4:
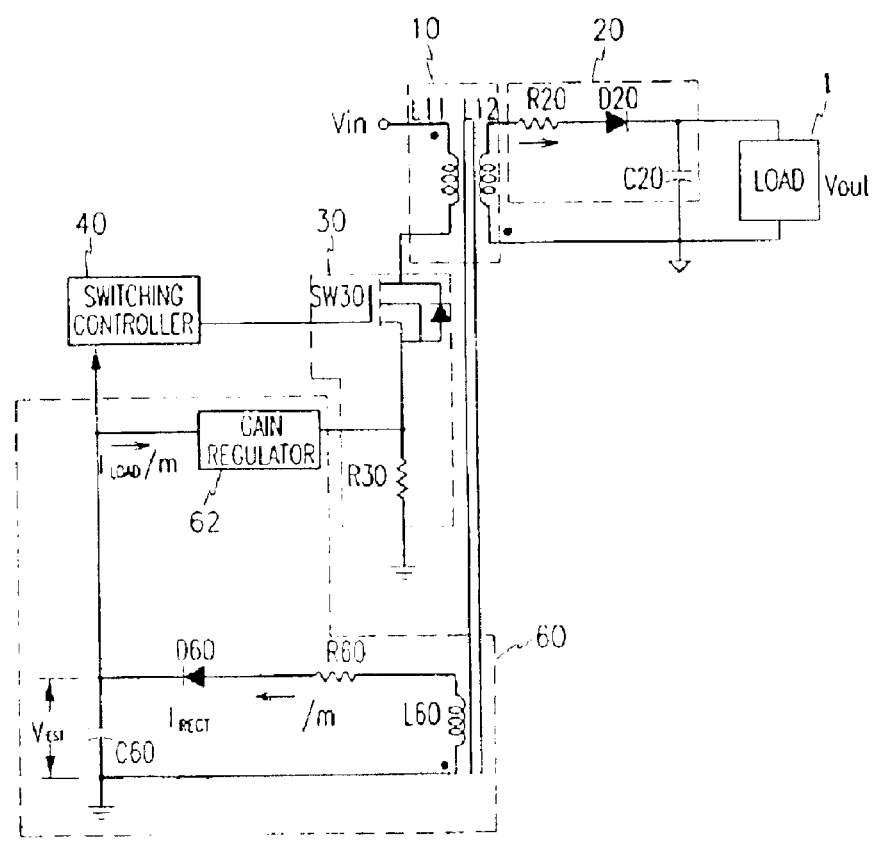
FIG. 4 is a circuit diagram of a flyback converter.

FIG. 4 illustrates another embodiment of a flyback converter. A transformer 10 changes an input voltage to a predetermined level according to a winding ratio of a primary coil to a secondary coil. An output unit 20 for rectifies an output voltage signal of the transformer 10 into a DC voltage to drive a load 1. A switch 30, coupled to the primary coil of the transformer 10, controls the on/off state of the power at the primary coil according to an input switching control signal. A double feedback unit 60 detects the voltage signal output from the transformer 10 to the output unit 20 and detects a switching current of the switch 30 to output a corresponding signal. A switching controller 40 receives the output signal of the double feedback unit 60 and generates the switching control signal for controlling the operation of the switch 30.

The transformer 10, the output unit 20, and the switch 30 may have the same or substantially similar architecture as illustrated in FIG. 1, and therefore will not be described in detail.

The double feedback unit 60 can include a detecting coil L60 for detecting an output power of the transformer 10 and having one terminal coupled to ground. A resistor R60 has one terminal coupled to the other terminal of the detecting coil L60. A diode D60 has an anode coupled to the other terminal of the resistor R60 and a cathode coupled to the switching controller 40. A capacitor C60 has one terminal coupled to the cathode of the diode D60 and the other terminal coupled to ground. A gain regulator 62 is coupled between one terminal of a resistor R30 of the switch 30 and the cathode of the diode D60.

Some embodiments of flyback converters may operate as follows. The transformer 10 can change an input voltage to a predetermined level according to the winding ratio of the primary coil L11 to the secondary coil L12. The output unit 20 rectifies the voltage signal output from the transformer 10 into a DC signal and drives the load 1.

The double feedback unit 60 detects the power output from the transformer 10 to the output unit 20, corrects the switching current of the switch 40 using the detected value, and outputs a corresponding signal to the switching controller 40. The detecting coil L60 of the double feedback unit 60 detects a voltage induced from the primary coil L11 of the transformer 10 to the secondary coil L12, and the diode D60 rectifies the detected voltage of the detecting coil L60 and then outputs a corresponding signal to the switching controller 40 via the capacitor C60.

However, the signal output from the capacitor C60 to the switching controller is not detected as an accurate value according to the state of the load 1. Hence the gain regulator 62 is used to correct the current flowing to the resistor R30 of the switch 30, guaranteeing accuracy of the signal value output to the switching controller 40 with a minimized error according to the state of the load 1.

Then the switching controller 40 receives the signal output from the double feedback unit 50, and generates a switching control signal for controlling the power transferred from the primary coil L11 of the transformer 10 to the secondary coil L12 according to the received signal value.

The MOSFET switch SW30 of the switch 30 is turned on/off according to the switching control signal output from the switching controller 40 to control whether to output the power source at the primary coil. This controls the quantity of power transferred from the transformer 10 to the output unit 20.

The flyback converter operating as described above may detect the output voltage at the detecting coil L60 and correct the detected value, but it requires a separate power supply circuit (not shown) for driving the internal circuit of the switching controller 40, and additional coils in the transformer 10. This increases the size of the whole circuit with a complicated construction.

Figure 5:
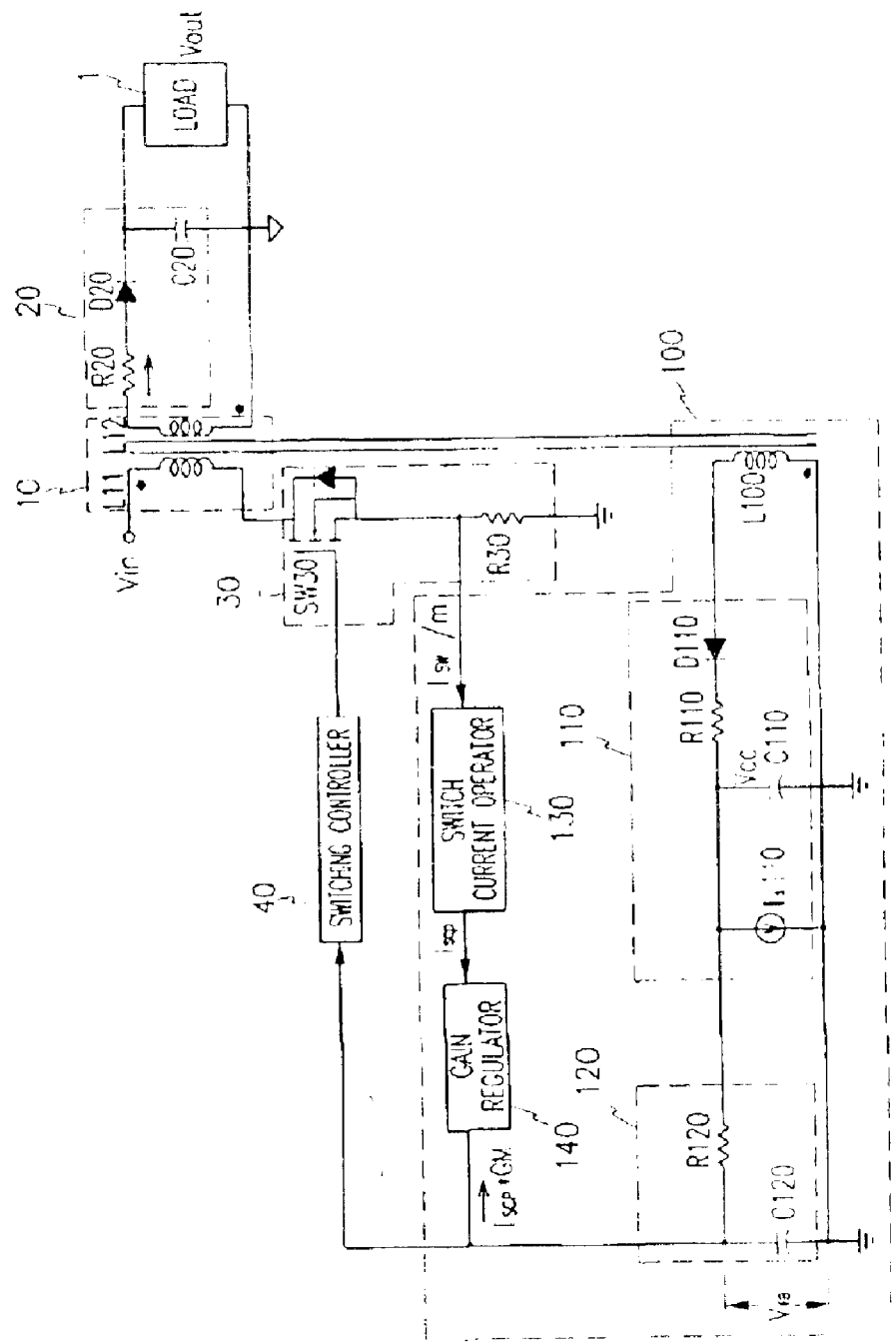
FIG. 5 is a circuit diagram illustrating an exemplary implementation of a flyback converter according to an embodiment of the present invention.

FIG. 5 illustrates an exemplary implementation of a flyback converter according to an embodiment of the invention. The flyback converter may provide a constant output voltage independent of the size of a load. The flyback converter may include a transformer 10 for changing an input voltage to a predetermined level according to a winding ratio of the primary coil to the secondary coil. An output unit 20 rectifies the voltage signal output from the transformer 10 into a DC signal to drive a load 1. A switch 30, coupled to the primary coil of the transformer, controls the on/off state of a power at the primary coil according to an input switching control signal. A feedback unit 100 detects the voltage signal output from the transformer 10 to the output unit 20 to produce a driving power, generates a feedback signal, and detects a switching current of the switch 30 to correct the feedback signal. A switching controller 40 operates according to the driving power output from the feedback unit 100 to receive the output signal of the feedback unit 100 and to generate the switching control signal for controlling the operation of the switch 30.

The transformer 10 may include a primary coil L11 having one terminal coupled to an input power Vin and the other terminal coupled to the switch 30. A secondary coil L12 receives an induced current from the primary coil L11 and has one terminal coupled to the output unit 20 and the other terminal coupled to ground.

The output unit 20 may include an output resistor R20 representing the sum of a winding resistance of the transformer 10 and a parasitic resistance of the output unit 20. A diode D20 has an anode coupled to a terminal of the output resistor R20 and a cathode coupled to the load 1. A capacitor C20 has one terminal coupled to the cathode of the diode D20 and the other terminal coupled to ground.

The switch 30 may include a MOSFET switch SW30 having a gate coupled to the output terminal of the switching controller 40. A resistor R30 has one terminal coupled to the source of the MOSFET switch SW30 and the other terminal coupled to ground.

The feedback unit 100 may include a detecting coil L100 for detecting an output power of the transformer 10. A driving power generator 110 rectifies the detected signal of the detecting coil L100 to generate a driving power signal for the operation of the switching controller 40. A feedback signal generator 120 filters the driving power signal generated from the driving power generator 110 to generate a stabilized feedback signal. A switch current operator 130 detects a current variation Isw/m according to the switching operation of the switch 30 to generate a converted current signal Iscp. A gain regulator 140 regulates the gain of the converted current signal output from the switch current operator 130 to generate a corrected current signal Iscp*GM. A feedback signal generator 120 drops the driving power signal output from the driving power generator 110 by a voltage corresponding to the corrected current signal output from the gain regulator 140 to generate a feedback voltage signal to the switching controller 40.

The driving power generator 110 may include a diode D110 having an anode coupled to a terminal of the detecting coil L100. A resistor R110 has one terminal coupled to the cathode of the diode D110. A capacitor C110 has one terminal coupled to the other terminal of the resistor R110 and the other terminal coupled to ground. A current source IS110 is coupled between both terminals of the capacitor C110.

The diode D110 and the resistor R110 can be switched in position. The current source IS110 includes the operating current of the switching controller, an additional current source, or the sum of the operating current of the switching controller and an additional current source.

The feedback signal generator 120 may include a resistor R120 having one terminal coupled to the output signal of the driving power generator 110 and the other terminal coupled to the gain regulator 140. A capacitor C120 has one terminal coupled to the other terminal of the resistor R120 and the other terminal coupled to ground.

The function of the switch current operator 130 can be realized with a peak detector, an averager or a combination of a peak detector and an averager.

The operation of the present embodiment of the invention will now be described as follows The transformer 10 may change an input voltage Vin to a predetermined level according to the winding ratio of the primary coil L11 to the secondary coil L12. The output unit 20 rectifies the voltage signal output from the transformer 10 into a DC signal and drives the load 1.

The feedback unit 100 detects the power output from the transformer 10 to the output unit 20 to generate a power for the operation of the switching controller 40, filters the value to generate a stabilized feedback signal, and corrects the feedback signal according to the detected value of the switching current of the switch 40.

The detecting coil L100 of the feedback unit 100 detects a voltage induced from the primary coil L11 of the transformer 10 to the secondary coil L12.

The driving power generator 110 of the feedback unit 100 receives the detected signal from the detecting coil L100, rectifies the received signal using the diode D110 and filters the rectified signal using the resistor R110 and the capacitor C110 to generate a driving power Vcc for operating of the switching controller 40.

The switch current operator 130 detects the current variation according to the switching operation of the MOSFET switch SW30 of the switch 30, and converts a detected current signal Isw/m to a signal having a standard for use in the circuit to output a converted current signal Iscp.

The gain regulator 140 receives the converted current signal Iscp from the switch current operator 130 and regulates the gain of the converted current signal to output a corrected current signal Iscp*GM.

The feedback signal generator 120 receives the driving power signal Vcc produced from the driving power generator 110, and reduces the driving power signal by a voltage drop by the gain regulator 140 to generate a feedback voltage signal $V_{FB}$ to the switching controller 40. The value of the feedback voltage signal is given by the following equation:

$$V_{FB} = V_{CC} - I_{scp} * GM * R120$$

In words, the feedback voltage signal $V_{FB}$ is given by subtracting a voltage drop caused by the corrected current signal Iscp*GM via the resistor R120 from the driving power signal Vcc.

The switching controller 40 receives the corrected feedback voltage signal $V_{FB}$ from the feedback unit 100 and generates a switching control signal for controlling the power transferred from the primary coil L11 of the transformer 10 to the secondary coil L12 according to the feedback voltage signal.

The MOSFET switch SW30 of the switch 30 is turned on/off according to the switching control signal output from the switching controller 40 to control whether to output the power at the primary coil, thereby controlling the quantity of power transferred from the transformer 10 to the output unit 20 adequately according to the load and power consumption conditions.

By correcting the output value of the feedback unit 100 using the switch current operator 130 and the gain regulator 140, the feedback voltage signal $V_{FB}$ is sustained at a predetermined level to provide a constant output voltage even though the driving voltage signal Vcc varies depending on the load condition.

The output voltage Vout can be detected and fed back without using a photo coupler, thus providing adequate switching control according to the load condition. In addition, the feedback signal is used without any additional coil for providing power for the operation of the circuit in the switching controller 40. This simplifies the construction of the circuit.

Figure 6:
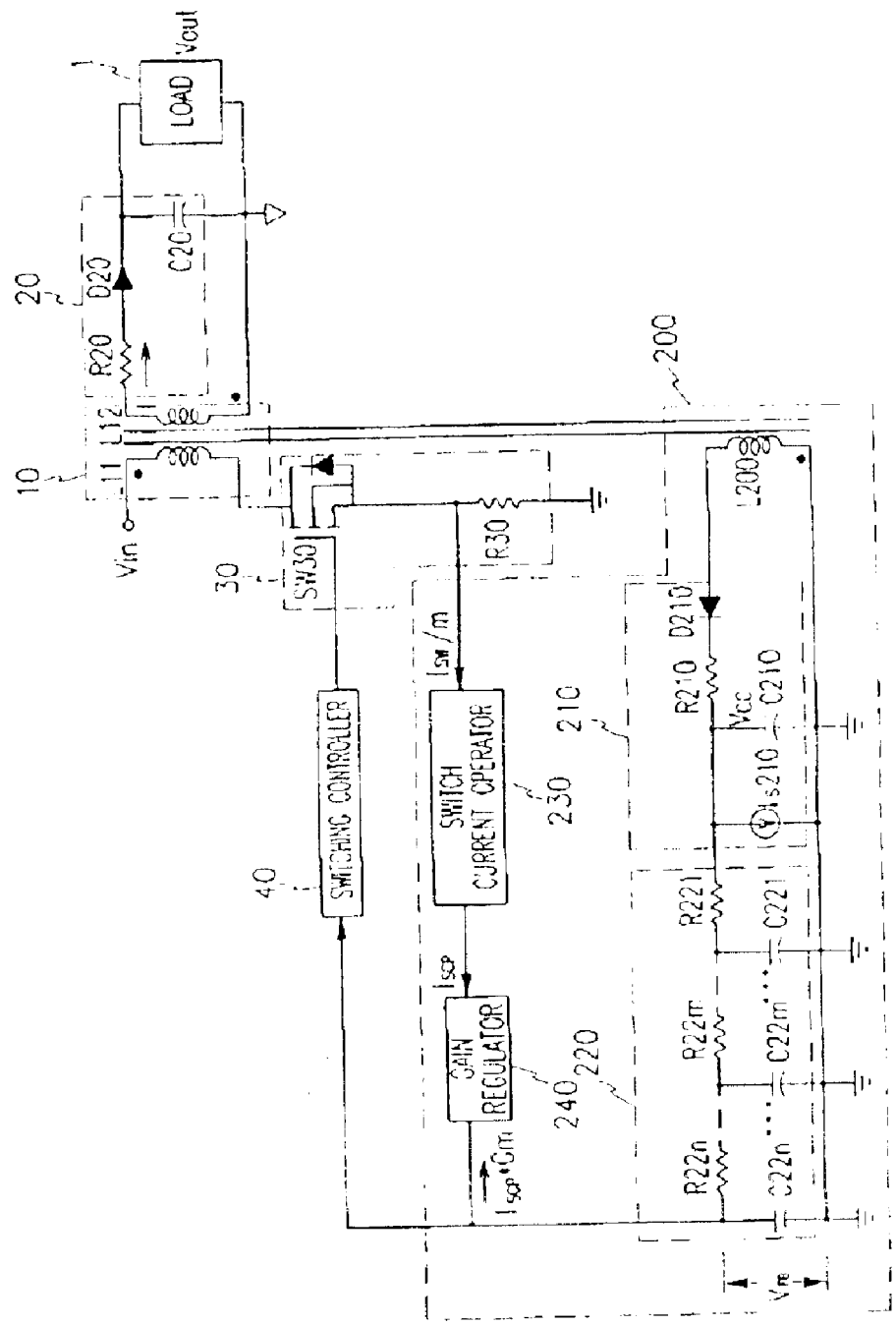
FIG. 6 is a circuit diagram illustrating an exemplary implementation of a flyback converter according to an embodiment of the present invention.

FIG. 6 illustrates an exemplary implementation of a flyback converter according to an embodiment of the invention. In this embodiment, the flyback converter does not use a photo coupler and provides a constant output voltage independent of the size of a load.

The flyback converter may include a transformer 10, which changes an input voltage to a predetermined level according to a winding ratio of the primary coil to the secondary coil. An output unit 20 rectifies the voltage signal output from the transformer 10 into a DC signal and drives a load 1. A switch 30, coupled to the primary coil of the transformer, controls the on/off state of a power at the primary coil according to an input switching control signal. A feedback unit 200 detects the voltage signal output from the transformer 10 to the output unit 20 to produce a driving power, filters the driving signal in multiple steps to generate a feedback signal, and detects a switching current of the switch 30 to correct the feedback signal. A switching controller 40 operates according to the driving power output from the feedback unit 200 to receive the output signal of the feedback unit 200 and to generate the switching control signal for controlling the operation of the switch 30.

The feedback unit 200 may include a detecting coil L200 for detecting an output power of the transformer 10. A driving power generator 210 for rectifies the detected signal of the detecting coil L200 to generate a driving power signal for the operation of the switching controller 40. A switch current operator 230 detects a current variation Isw/m according to the switching operation of the switch 30 to generate a converted current signal Iscp. A gain regulator 240 regulates the gain of the converted current signal output from the switch current operator 230 to generate a corrected current signal Iscp*GM. A feedback signal generator 220 stabilizes the driving power signal output from the driving power generator 210 and reduces the driving power signal by a voltage drop corresponding to the corrected current signal output from the gain regulator 240 to generate a feedback voltage signal to the switching controller 40.

The driving power generator 210 may include a diode D210 having an anode coupled to the other terminal of the detecting coil L200. A resistor R210 has one terminal coupled to the cathode of the diode D210. A capacitor C210 has one terminal coupled to the other terminal of the resistor 110 and the other terminal coupled to ground. A current source IS210 is coupled between both terminals of the capacitor C210.

Here, the diode D210 and the resistor R210 can be switched in position. The current source IS210 includes the operating current of the switching controller, an additional current source, or the sum of the operating current of the switching controller and an additional current source.

The feedback signal generator 220 may include a first stage stabilizer and m-th to n-th stage stabilizers coupled in series for filtering the output signal of the driving power generator 210 and stabilizing it.

The first stage stabilizer may include a resistor R221 having one terminal coupled to the output signal of the driving power generator 210 and the other terminal coupled to the gain regulator 240. A capacitor C221 has one terminal coupled to the other terminal of the resistor R221 and the other terminal coupled to ground.

The m-th to n-th stage stabilizers are similar in structure to the first stage stabilizer, and each receives the output signal of the previous stage stabilizer and stabilizes the value. The further components (different from the feedback unit 200) are the same as those of the embodiment of FIG. 5.

The operation of the present embodiment of the invention will now be described as follows. The transformer 10, the output unit 20, the switch 30, and the switching controller 40 excepting the feedback unit 200 in the present embodiment operate in the same manner as described in the embodiment of FIG. 5.

The feedback unit 200 detects the power output from the transformer 10 to the output unit 20 to generate a power for the operation of the switching controller 40, filters the power value to generate a stabilized feedback signal, and corrects the feedback signal according to the detected value of the switching current of the switch 40. The detecting coil L200 of the feedback unit 200 detects a voltage induced from the primary coil L11 of the transformer 10 to the secondary coil L12.

The switch current operator 230 detects the current variation according to the switching operation of the MOSFET switch SW30 of the switch 30 and converts a detected current signal Isw/m to a signal having a standard for use in the circuit to output a converted current signal Iscp. The gain regulator 240 receives the converted current signal Iscp from the switch current operator 230 and regulates the gain of the converted current signal to output a corrected current signal Iscp*GM.

The feedback signal generator 220 receives the driving power signal Vcc produced from the driving power generator 210 and reduces the driving power signal by a voltage drop by the gain regulator 240 to generate a feedback voltage signal $V_{FB}$ to the switching controller 40. The feedback voltage signal $V_{FB}$ is derived by subtracting a voltage drop caused by the corrected current signal Iscp*GM via the resistor R120 from the driving power signal Vcc. The switching controller 40 receives the corrected feedback voltage signal $V_{FB}$ from the feedback unit 200, and generates a switching control signal for controlling the power transferred from the primary coil L11 of the transformer 10 to the secondary coil L12 according to the feedback voltage signal.

The present embodiment provides a stabilized feedback voltage signal $V_{FB}$. By correcting the output value of the feedback unit 200 using the switch current operator 230 and the gain regulator 240, the feedback voltage signal $V_{FB}$ is sustained at a predetermined level to provide a constant output voltage even though the driving voltage signal Vcc is variable depending on the load condition. In addition, the output voltage Vout can be detected and fed back without using a photo coupler, this providing adequate switching control according to the load condition.

Figure 7:
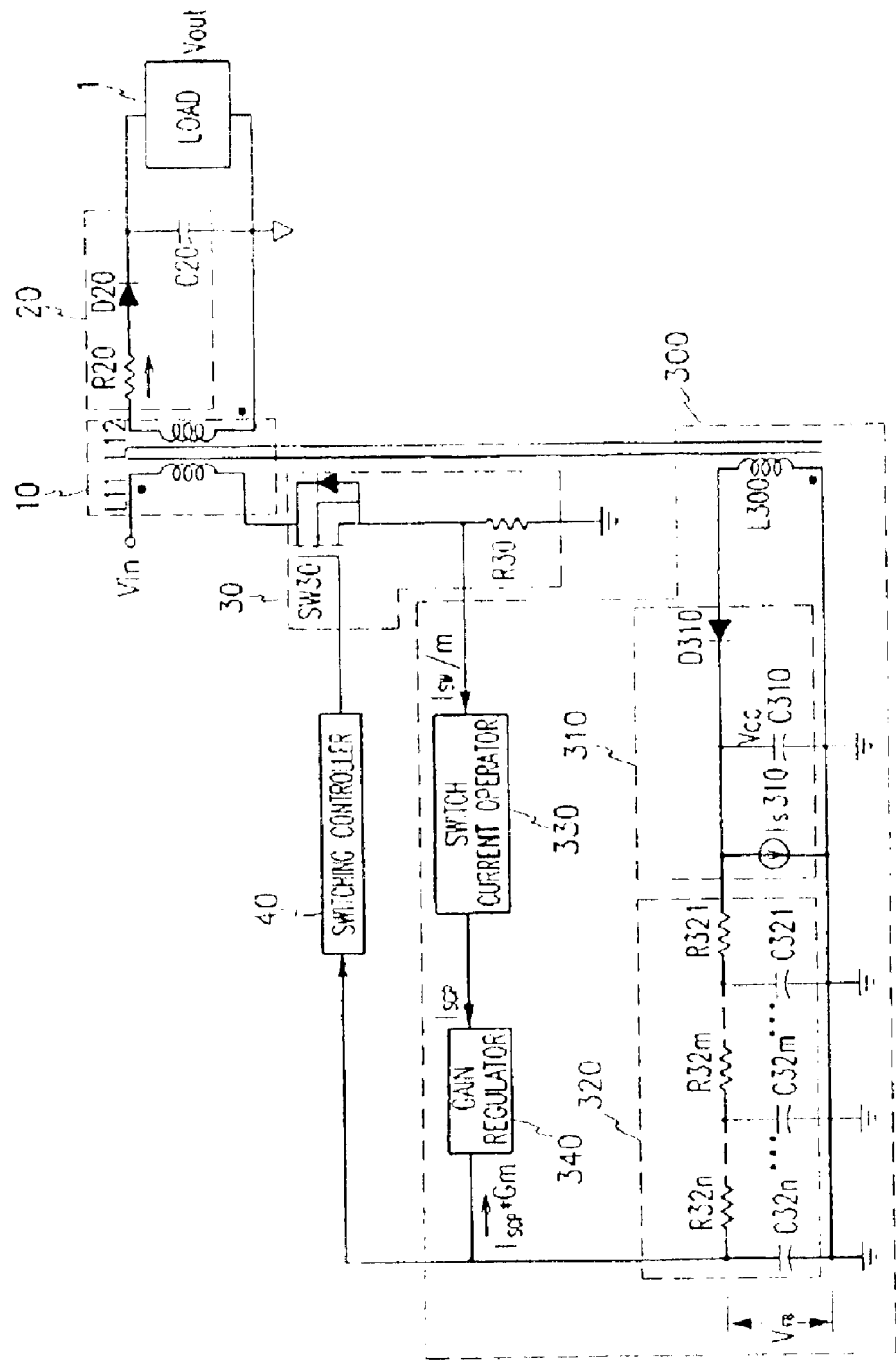
FIG. 7 is a circuit diagram illustrating an exemplary implementation of a flyback converter according to an embodiment of the present invention.

FIG. 7 illustrates an exemplary implementation of a flyback converter according to an embodiment of the present invention. The present embodiment in many respects has a similar architecture and operation as the embodiment of FIG. 6. The present embodiment differs from the embodiment of FIG. 6 in at least the driving power generator 310 of the feedback unit 300.

The capacitor C310 of the driving power generator 310 is used to realize the filtering function in the present embodiment. The multi-staged filtering operation performed by the feedback signal generator 320 complements the absence of the resistor in the driving power generator 310. The other components operate in substantially the same manner as described in the embodiment of FIG. 6.

Figure 8:
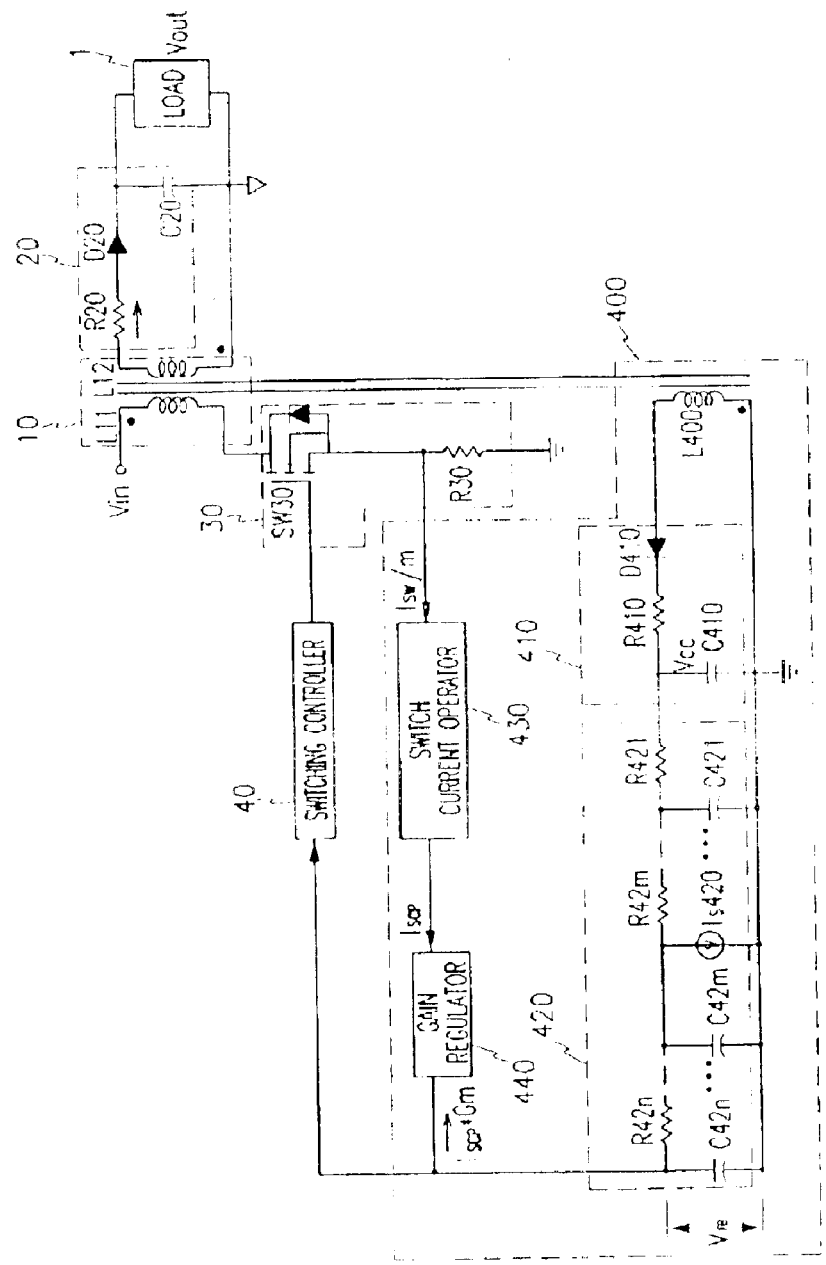
FIG. 8 is a circuit diagram illustrating an exemplary implementation of a flyback converter according to an embodiment of the present invention.

FIG. 8 illustrates an exemplary implementation of a flyback converter according to an embodiment of the present invention. The present embodiment in many respects has a similar architecture and operation as the embodiment of FIG. 6. The present embodiment differs from the embodiment of FIG. 6 in at least the driving power generator 410 and the feedback signal generator 420 of the feedback signal 400.

The driving current source IS420 is positioned in the feedback generator 420 in the present embodiment. The whole feedback voltage signal $V_{FB}$ may have the same effect even when the current source IS420 is formed in the middle of the multi-staged stabilizers of the feedback signal generator 420.

Here, the current source IS420 includes an operating current of the switching controller, an additional current source, or the sum of an operating current value of the switching controller and an additional current source. The other components operate in substantially the same manner as described in the embodiment of FIG. 6.

The flyback converters according to embodiments of the present invention detect the output voltage at the primary coil without using a photo coupler, and provide an essentially constant voltage independent of the size of a load. In the flyback converters according to embodiments of the present invention, the number of additional coils in the transformer circuit is minimized to reduce the size of the whole circuit and simplify the construction, while providing accurate power control. Accordingly, the flyback converters according to embodiments of the present invention feed back the power at the primary coil of the transformer and correct the power according to the switch current detection, thereby realizing adequate switch control. Also, the flyback converters according to embodiments of the present invention use a detecting coil in generating a driving power for the operation of the switching controller. Therefore, no additional coil is required for the production of power, thus simplifying the construction of the circuit and reducing the cost.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A flyback converter, which provides an essentially constant output voltage independent of the size of a load, the flyback converter comprising:

a transformer operable to change an input voltage to a predetermined level according to a winding ratio of a primary coil to a secondary coil;

an output unit, coupled to the transformer, operable to rectify a voltage signal output from the transformer into a DC signal operable to drive the load;

a switch, coupled to the primary coil of the transformer, operable to control an on/off state of a power at the primary coil according to an input switching control signal;

a feedback unit, coupled to the transformer, operable to detect the voltage signal output by the transformer to the output unit, generating a feedback signal, detecting a switching current of the switch to correct the feedback signal, and outputting the corrected feedback signal, the feedback unit comprising:

a detecting coil operable to detect the power output from the transformer;

a driving power generator operable to rectify a detected signal of the detecting coil to generate a driving power for the operation of the switching controller;

a switch current operator operable to detect a current variation according to the switching operation of the switch to generate a converted current signal;

a gain regulator operable to regulate the gain of the converted current signal output from the switch current operator to generate a corrected current signal; and a feedback signal generator operable to reduce the driving power signal output from the driving power generator by a voltage drop corresponding to the corrected current signal output from the gain regulator to generate a feedback voltage signal to the switching controller; and a switching controller, coupled to the feedback unit and to the switch, operable to receive an output signal of the feedback unit and generating a switching control signal, operable to control the operation of the switch.

2. The flyback converter as claimed in claim 1, wherein the driving power generator comprises:

a diode having an anode coupled to a terminal of the detecting coil;

a resistor having one terminal coupled to the cathode of the diode;

a capacitor having one terminal coupled to the other terminal of the resistor and the other terminal coupled to ground; and a current source coupled between the both terminals of the capacitor.

3. The flyback converter as claimed in claim 2, wherein the current source includes an operating current value of the switching controller or an additional current source.

4. The flyback converter as claimed in claim 1, wherein the feedback signal generator comprises:

a resistor having one terminal coupled to an output signal of the driving power generator and the other terminal coupled to the gain regulator; and a capacitor having one terminal coupled to the other terminal of the resistor and the other terminal coupled to ground.

5. A flyback converter, which provides a constant output voltage independent of the size of a load, the flyback converter comprising:

a transformer operable to change an input voltage to a predetermined level according to a winding ratio of a primary coil to a secondary coil;

an output unit operable to rectify a voltage signal output from the transformer into a DC signal and driving the load;

a switch coupled to the primary coil of the transformer operable to control the on/off state of a power at the primary coil according to an input switching control signal;

a feedback unit operable to detect the voltage signal output from the transformer to the output unit to generate a driving power, filtering the driving signal in multiple steps to generate a stabilized feedback signal, and detecting a switching current of the switch to correct the feedback signal, the feedback unit comprising:

a detecting coil operable to detect the power output from the transformer;

a driving power generator operable to rectify a detected signal of the detecting coil to generate a driving power for the operation of the switching controller;

a switch current operator operable to detect a current variation according to the switching operation of the switch to generate a converted current signal;

a gain regulator operable to regulate the gain of the converted current signal output from the switch current operator to generate a corrected current signal; and a feedback signal generator operable to stabilize the driving power signal output from the driving power generator and reducing the stabilized driving power signal by a voltage drop corresponding to the corrected current signal output from the gain regulator to generate a feedback voltage signal to the switching controller; and a switching controller operating according to the driving power output from the feedback unit to receive an output signal of the feedback unit and generate a switching control signal operable to control the operation of the switch.

6. The flyback converter as claimed in claim 5, wherein the driving power generator comprises:

a diode having an anode coupled to a terminal of the detecting coil;

a resistor having one terminal coupled to the cathode of the diode;

a capacitor having one terminal coupled to the other terminal of the resistor and the other terminal coupled to ground; and a current source coupled between both terminals of the capacitor.

7. The flyback converter as claimed in claim 5, wherein the current source includes an operating current value of the switching controller or an additional current source.

8. The flyback converter as claimed in claim 5, wherein the feedback signal generator comprises:

a first stage stabilizer and m-th to n-th stage stabilizers coupled in series for stabilizing the output signal of the driving power generator.

9. The flyback converter as claimed in claim 8, wherein the first stage stabilizer comprises:

a resistor having one terminal coupled to an output signal of the driving power generator and the other terminal coupled to the gain regulator; and a capacitor having one terminal coupled to the other terminal of the resistor and the other terminal coupled to ground.

10. The flyback converter as claimed in claim 5, wherein the driving power generator comprises:

a diode having an anode coupled to a terminal of the detecting coil;

a capacitor having one terminal coupled to the cathode of the diode and the other terminal coupled to ground; and a current source coupled between the both terminals of the capacitor.

11. The flyback converter as claimed in claim 10, wherein the current source includes an operating current value of the switching controller or an additional current source.

12. The flyback converter as claimed in claim 5, wherein the feedback signal generator comprises:

a first stage stabilizer and m-th to n-th stage stabilizers coupled in series for filtering the output signal of the driving power generator; and a current source coupled to the after-terminal of any one of the stage stabilizers.

13. The flyback converter as claimed in claim 12, wherein the current source includes an operating current value of the switching controller or an additional current source.

14. A flyback converter, which provides an essentially constant output voltage independent of the size of a load, the flyback converter comprising:

a transformer operable to change an input voltage to a predetermined level according to a winding ratio of a primary coil to a secondary coil;

an output unit, coupled to the transformer, operable to rectify a voltage signal output from the transformer into a DC signal operable to drive the load;

a switch, coupled to the primary coil of the transformer, operable to control an on/off state of a power at the primary coil according to an input switching control signal;

a feedback unit, coupled to the transformer, operable to detect the voltage signal output by the transformer to the output unit, generating a feedback signal, detecting a switching current of the switch to correct the feedback signal, and outputting the corrected feedback signal, the feedback unit not containing a photocoupler; and a switching controller, coupled to the feedback unit and to the switch, operable to receive an output signal of the feedback unit and generating a switching control signal, operable to control the operation of the switch.

15. A flyback converter, which provides an essentially constant output voltage independent of the size of a load, the flyback converter comprising:

a transformer operable to change an input voltage to a predetermined level according to a winding ratio of a primary coil to a secondary coil;

an output unit, coupled to the transformer, operable to rectify a voltage signal output from the transformer into a DC signal operable to drive the load;

a switch, coupled to the primary coil of the transformer, operable to control an on/off state of a power at the primary coil according to an input switching control signal;

a single feedback unit, coupled to the transformer, operable to detect the voltage signal output by the transformer to the output unit, generating a feedback signal, detecting a switching current of the switch to correct the feedback signal, and outputting the corrected feedback signal, the feedback unit not connected to the secondary coil and the output unit; and a switching controller, coupled to the feedback unit and to the switch, operable to receive an output signal of the feedback unit and generating a switching control signal, operable to control the operation of the switch.

* * * * *